May 11, 1937.  C. W. McKINLEY ET AL  2,079,913
PRESSURE GAUGE
Filed Jan. 17, 1936
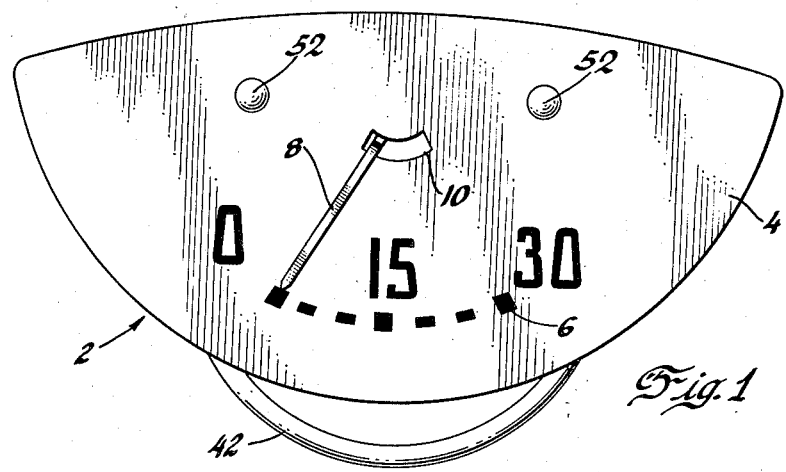
Fig. 1
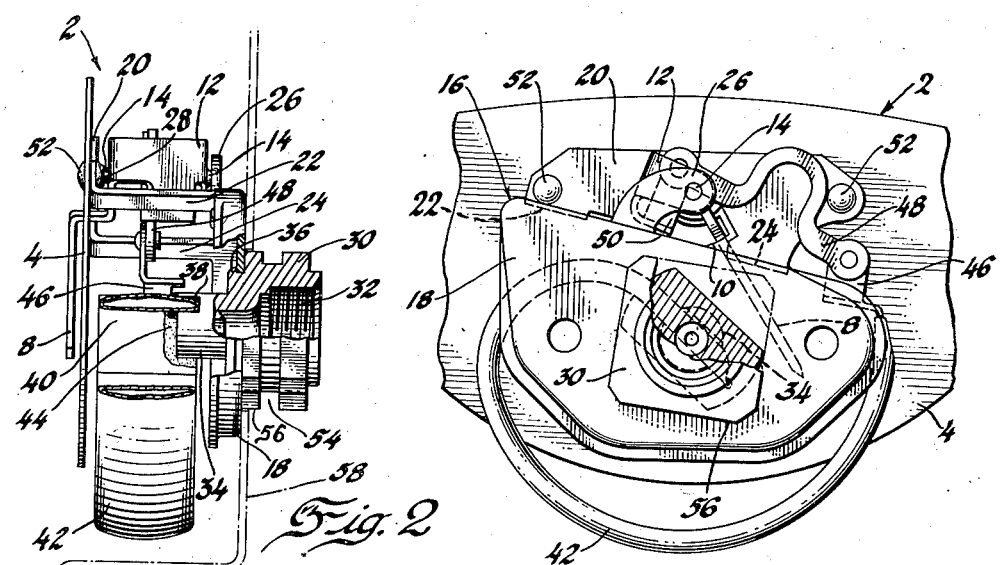
Fig. 2
Fig. 3
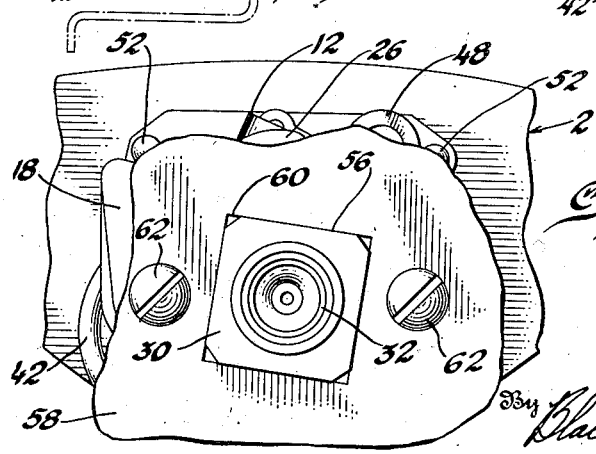
Fig. 4
Inventors
Charles W. McKinley
Elbridge F. Bacon &
Ragnar F. Clason
By Blackmore, Spencer & Flint
Attorneys Patented May 11, 1937

2,079,913

UNITED STATES PATENT OFFICE 2,079,913

PRESSURE GAUGE

Charles W. McKinley, Elbridge F. Bacon, and Ragnar F. Clason, Flint, Mich., assignors to General Motors Corporation, Detroit, Mich., a corporation of Delaware Application January 17, 1936, Serial No. 59,504

1 Claim. (Cl. 73—109)

This invention relates to improvements in Bourdon tube gauges.

The improvements relate to the interrelation of the frame and the socket for the Bourdon tube, in the mounting of the pointer, and in the mounting of the frame in the casing.

Figure 1 is a front view of the gauge with the casing removed.

Figure 2 is a side view of the structure of Figure 1 with parts shown in section better to illustrate the invention.

Figure 3 is a view of the gauge from the rear.

Figure 4 is a view from the rear of a part of the frame and casing showing the connection therebetween.

Referring to the drawing, the gauge as a whole is indicated at 2. The gauge has the dial 4 having the scale 6, and the pointer 8 adapted to move thereover. The dial is provided with an arcuate opening 10 through which the pointer operates.

Behind the dial the pointer has integrally formed therewith the U-shaped frame 12, the legs of the U being provided with pins or studs 14 by means of which the pointer is pivoted to the main frame indicated as a whole at 16. The studs 14 may or may not be integral with the frame 12. The one piece frame 16 comprises the flat plate 18 having an upturned reinforcing edge, the dial support 20 and the legs 22 and 24 which connect the plate to the dial support. The frame has the finger 26 bent therefrom between the legs 22 and 24, the end of the finger being provided with an opening to receive one of the pins 14 of the frame 12 of the pointer mechanism. The other pin is pivoted in an opening in a raised portion 28 on the dial support 20.

A bored socket 30 is internally threaded at 32 for connection to a suitable pipe and is received in an opening in the plate 18. The socket has the stud part 34 projecting inwardly of the gauge, and the shoulder 36 which is turned over after the socket is inserted in the opening and serves rigidly to hold the socket in the plate 18.

The stud 34 has a notch 38 cut in its end to receive the end 40 of the Bourdon tube 42. The end 40 is soldered as at 44 in the notch 38 and is curved around and ends in the wing 46 to which there is pivoted one end of a link 48, the other end of which is pivoted to a finger 50 integral with the frame 12 of the pointer mechanism.

From Figure 2 it is apparent that the Bourdon tube 42 is positioned between the plate 18 and the dial 4 which is secured to the support 20 by means of the rivets 52.

In Figures 1 and 3 of the drawing the usual casing for the gauge is not shown and it is therefore apparent that the socket 30 is mounted on the gauge independently of the casing. As described, the socket 30 is mounted directly on the frame 16 and both socket and Bourdon tube may therefore be assembled and secured together free of the casing.

The socket 30 is provided with the groove 54, the purpose of which is to receive suitable fingers of a testing apparatus when the gauge is applied to the testing apparatus during the testing operation. The socket is also provided with a squared part 56 the purpose of which is to hold the frame and socket against turning when mounted in the casing 58. The casing has a square opening 60 to conform to the squared part 56 so that when the socket is to be mounted in the casing, the squared connection will take all the strain and torque when tightening the connecting nut, thus avoiding strain on the frame or mechanism. The casing 58 and frame 16 are secured together by the screws 62.

We claim:

In a Bourdon tube gauge having a dial, a frame comprising a plate, a dial support, and two legs connecting the plate and dial support, a bent edge on the plate to reinforce the same, a finger integral with the frame and projecting from between the legs in a plane parallel to the support, a pointer turnably mounted between the finger and the support, a socket mounted in the plate, and a Bourdon tube mounted in the socket between the dial and plate.

CHARLES W. McKINLEY.
ELBRIDGE F. BACON.
RAGNAR F. CLASON.